United States Patent [19]

Pagel et al.

[11] 4,292,686
[45] Sep. 29, 1981

[54] TUNING SYSTEM FOR RECEIVER OF PILOT-MODULATED CARRIER WAVES

[75] Inventors: Ernst O. Pagel, Böhmfeld; Robert Harth, Wettstetten, both of Fed. Rep. of Germany

[73] Assignee: Audi NSU Auto Union AG, Neckarsulm, Fed. Rep. of Germany

[21] Appl. No.: 43,849

[22] Filed: May 30, 1979

[30] Foreign Application Priority Data

Jun. 1, 1978 [DE] Fed. Rep. of Germany ....... 2824006

[51] Int. Cl.³ .............................................. H04B 1/10
[52] U.S. Cl. .................................. 455/194; 455/174; 455/212
[58] Field of Search ............... 325/417, 419, 420, 423, 325/402, 403, 313, 456, 478; 334/49, 2, 7; 455/194, 174, 212, 225, 352, 218, 229, 312; 179/1 VC, 1 SW

[56] References Cited

U.S. PATENT DOCUMENTS

| | | | |
|---|---|---|---|
| 2,186,825 | 1/1940 | Dome | 455/174 |
| 2,560,313 | 7/1951 | Tellier | 455/174 |
| 3,493,681 | 2/1970 | Richards | 179/1 SW |
| 3,806,818 | 4/1974 | Uchiyama | 455/174 |
| 3,870,956 | 3/1975 | Wolff | 455/352 |
| 3,995,220 | 11/1976 | Hansen | 455/225 |
| 4,163,203 | 7/1979 | Morii | 455/194 |

FOREIGN PATENT DOCUMENTS

2806783 8/1979 Fed. Rep. of Germany ...... 455/194

*Primary Examiner*—Howard Britton
*Assistant Examiner*—Tommy P. Chin
*Attorney, Agent, or Firm*—Karl F. Ross

[57] ABSTRACT

A radio receiver, especially one for automotive vehicles, includes a selector switch operable to cut off the audio stage unless the r-f stage is tuned to a carrier modulated by a pilot frequency which triggers a detector therefor into emission of an enabling signal. With the selector switch operated, a bistable component — which could be a flip-flop or a pair of cascaded relays with holding contact — generates a disconnect signal until the enabling signal appears, whereupon the audio stage remains connected even upon a fading of the modulated carrier until the arrival of an interrupt signal due to the manipulation of a knob or pushbutton serving to retune the receiver.

10 Claims, 4 Drawing Figures

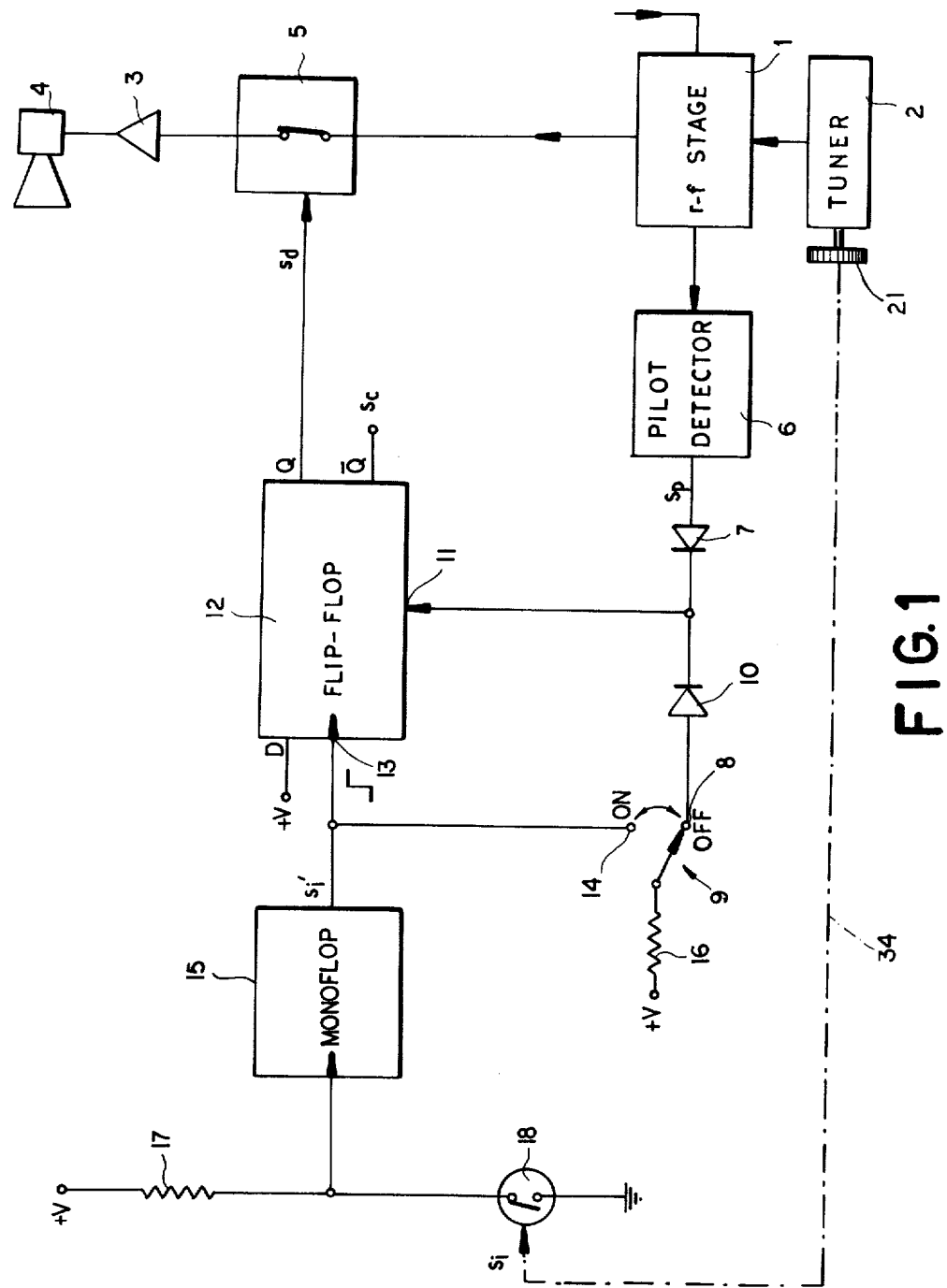

4,292,686

TUNING SYSTEM FOR RECEIVER OF PILOT-MODULATED CARRIER WAVES

FIELD OF THE INVENTION

Our present invention relates to a system for the tuning of a radio receiver, e.g. for an automotive vehicle, designed to pick up carrier waves modulated by a pilot frequency.

BACKGROUND OF THE INVENTION

The dissemination of traffic information to motorists is usually carried out by transmitters operating in the UHF band whose carrier waves can be pulled in only with a rather precise adjustment of the tuning circuit of a receiver. Drivers required to pay attention to road traffic cannot concentrate for long periods on the tuning mechanism of their receivers whose adjustment by the usual knobs tends to pass rather quickly through the desired UHF station. It has therefore become customary to modulate the carriers of such transmitters with a pilot tone above the audible-frequency range, e.g. of 57 kHz, which can be detected by suitably designed receiving equipment.

In a known receiver of this type, a switch is provided for disconnecting the audio stage from the preceding r-f (or i-f) stage whenever it is desired to pick up a traffic-monitoring station characterized by the aforementioned pilot tone. Upon manipulation of the tuner, a detector in the receiver recognizes the pilot frequency and reconnects the audio stage to enable the reception of messages. When the incoming high-frequency signal fades, the detector again disconnects the audio stage from the remainder of the system.

Thus, a driver passing through zones of poor reception is bound to experience an annoying alternation of cutoff and cut-in of the station to which the receiver is tuned.

OBJECT OF THE INVENTION

The object of our present invention, accordingly, is to provide an improved tuning system for a receiving of the character described which avoids these undesirable message interruptions.

SUMMARY OF THE INVENTION

In accordance with our present invention, a receiver including coupling means for interconnecting a high-frequency stage and a low-frequency stage under the control of an enabling signal from a pilot detector comprises sensing means operatively coupled with the tuning mechanism for the high-frequency stage to generate an interrupt signal in response to manipulation of the tuning mechanism, and a bistable component with input connections to the pilot detector and to the sensing means and with an output connection to the coupling means for interconnecting the two stages in response to the enabling signal and disconnecting the low-frequency stage only upon a coincidence of the interrupt signal with an absence of the enabling signal.

In this way, a temporary fading of the pilot-modulated carrier leaves the audio stage conected until and unless the user manipulates the tuning mechanism in search of another traffic-monitoring station, for example. Following such disconnection, the audio stage is reconnected as soon as a pilot frequency is again detected. Preferably, however, the disconnection of the audio stage may also be prevented by a selector switch having an overriding position in which the receiver stages are kept interconnected through the coupling means thereof independently of the enabling and interrupt signals referred to.

The bistable component responsive to these enabling and interrupt signals may comprise a flip-flop with a resetting input connected to the pilot detector and with a switching input connected to the sensing means, advantageously by way of a monostable circuit or monoflop designed to establish an interrupt signal of predetermined duration if the sensing means comprises a pulse generator entrained by an adjusting knob forming part of the tuning mechanism. Such a pulse generator could include a disk on the tuning-knob shaft with alternately conducting and nonconducting zones engaged by a wiper. As a possible modification, the zones could be alternately transparent and opaque, or reflecting and nonreflecting, the pulse generator in this case further comprising a light source intermittently illuminating a photocell by way of these sectors upon rotation of the knob. Capacitive or inductive motion detectors could, of course, also be used.

There are, however, a number of other ways in which the sensing means working into the bistable component could be controlled by the tuning mechanism to emit an interrupt signal when that mechanism is being manipulated. Thus, for example, a pushbutton serving to initiate automatic tuning or to shift to a preselected station could be provided with a so-called tap switch sensitive to the touch.

Instead of using purely electronic circuitry such as a flip-flop, we may design the bistable component as an electromagnetic device including, for example, two cascaded relays provided with a holding circuit.

BRIEF DESCRIPTION OF THE DRAWING

The above and other features of our invention will now be described in detail with reference to the accompanying drawing in which:

FIG. 1 is a circuit diagram of a radio receiver embodying our invention;

SPECIFIC DESCRIPTION

Figure 3:
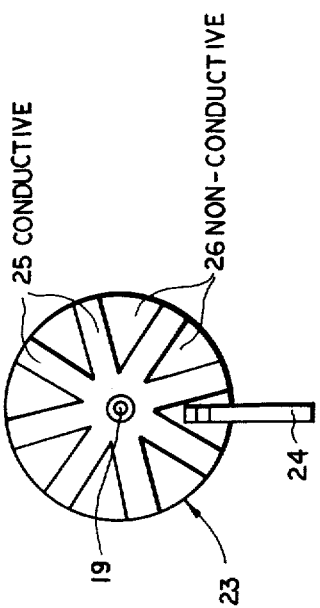
FIG. 3 is a view taken on the line III—III of FIG. 2.

In FIG. 1 we have shown a radio receiver provided with a radio-frequency stage 1 connected via a coupling switch 5 to an audio amplifier 3 feeding a loudspeaker 4. Receiver stage 1 is provided with a conventional tuning circuit 2 whose resonance frequency can be changed with the aid of a manual adjuster in the form of a rotary knob 21. Stage 1 also has an output connected to a pilot detector 6 emitting an enabling signal $s_p$ whenever that stage is tuned to an incoming carrier wave modulated by a predetermined frequency above the audio range, such as an "IRA pilot tone" of 57 kHz. This enabling signal $s_p$ is applied via a diode 7 to a resetting input 11 of a data-type flip-flop 12 also having a switching input 13. The data input of the flip-flop is permanently connected to a source of positive potential $+V$ such as a terminal of a vehicular battery; the negative terminal of that battery is assumed to be grounded.

Tuning knob 21 is coupled via a linkage 34, illustrated schematically, with a normally open switch 18 which is connected across the d-c supply in series with a resistor 17 and is normally open. Whenever knob 21 is manipulated, linkage 34 transmits to switch 18 an interrupt signal $s_i$ closing that switch. Upon such closure, the voltage drop occurring at the junction of switch 18 with resistor 17 trips to a monoflop 15 to generate a modified interrupt signal $s_i'$ of predetermined duration, e.g. several seconds. This signal is fed to the switching input 13 of flip-flop 12 which is of the differentiating type so that a switchover of the flip-flop occurs only on a leading or a trailing edge of an incoming pulse, provided that resetting input 11 is not energized. Input 13 is also tied to a bank contact 14 of a selector switch 9 which is connected via a resistor 16 to positive terminal +V; another bank contact 8 of switch 9 is connected by way of a diode 10 to resetting input 11. Contacts 8 and 14 are respectively engaged in an "ON" position and in an "OFF" position of switch 9, the search-facilitating system according to our invention being effective only in its ON position.

As long as selector switch 9 is in its OFF position, resetting input 11 is continuously energized from terminal +V so that the set output Q of flip-flop 12 is cut off and coupling switch 5 remains closed. When the user desires to receive messages from an UHF channel having a pilot-modulated carrier, he reverses the switch 14 and applies positive voltage to input 13 which thereupon sets the flip-flop and energizes its output Q with a disconnect signal $s_d$ opening the switch 5. This situation persists until the appearance of a pilot-modulated carrier in the input of r-f stage 1 gives rise to the enabling signal $s_p$ delivered by detector 6 to resetting input 11. Even if that signal $s_p$ disappears, flip-flop 12 remains reset so long as constant potential (zero or +V) is present on its switching input 13.

When the user turns the knob 21 of tuner 2, signal $s_i$ closes the switch 18 to trip the monoflop 15 whereby a signal $s_i'$ in the form of a negative pulse of fixed duration is applied to input 13. As a result, and in the absence of signal $s_p$ on resetting input 11, flip-flop 12 is set once more and reopens the switch 5 until detector 6 has again an output. If the signal $s_i$ controlling the switch 18 is a pulse train, generated in the manner described hereinafter with reference to FIGS. 2 and 3, intermittent opening of switch 18 will not reset the flip-flop during the off-normal period of monoflop 15. Should no pilot tone be found within this period, flip-flop 12 will be reset by the trailing edge of pulse $s_i'$ but will be set again upon the retriggering of monoflop 15 as the search continues. In any event, a restoration of selector switch 9 to its illustrated OFF position definitely resets the flip-flop regardless of its previous condition.

Figure 2:
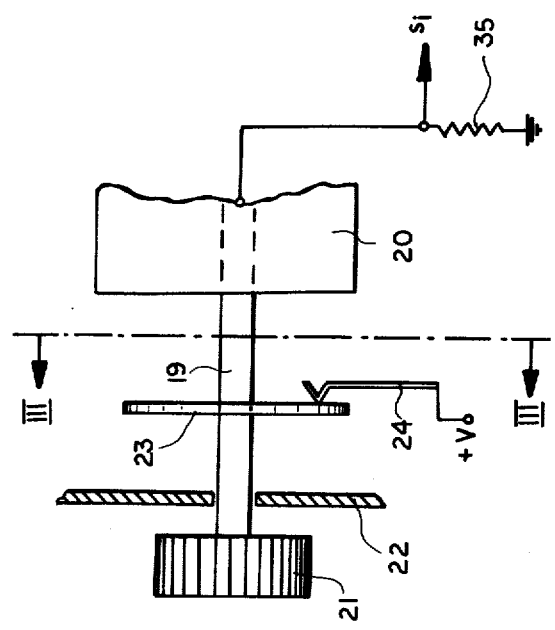
FIG. 2 is a somewhat schematic elevational side view of a tuning knob and an associated pulse generator forming part of the receiver of FIG. 1.

As shown in FIG. 2, adjusting knob 21 has a shaft 19 journaled in a housing wall 22 and connected with a tuning element 20 such as a rotary capacitor. Shaft 19 carries a disk 23 which, as illustrated in FIG. 3, is angularly subdivided into alternately conductive and nonconductive zones 25, 26 coacting with a wiper 24 which is connected to potential +V; shaft 19 works into a control circuit which is grounded through a resistor 35 developing the pulse train $s_i$ when knob 21 is being rotated. Regardless of the number of pulses generated during rotation of the knob (e.g. during fine tuning), flip-flop 12 will not be switched after the first pulse of the train which trips the monoflop 15.

Figure 4:
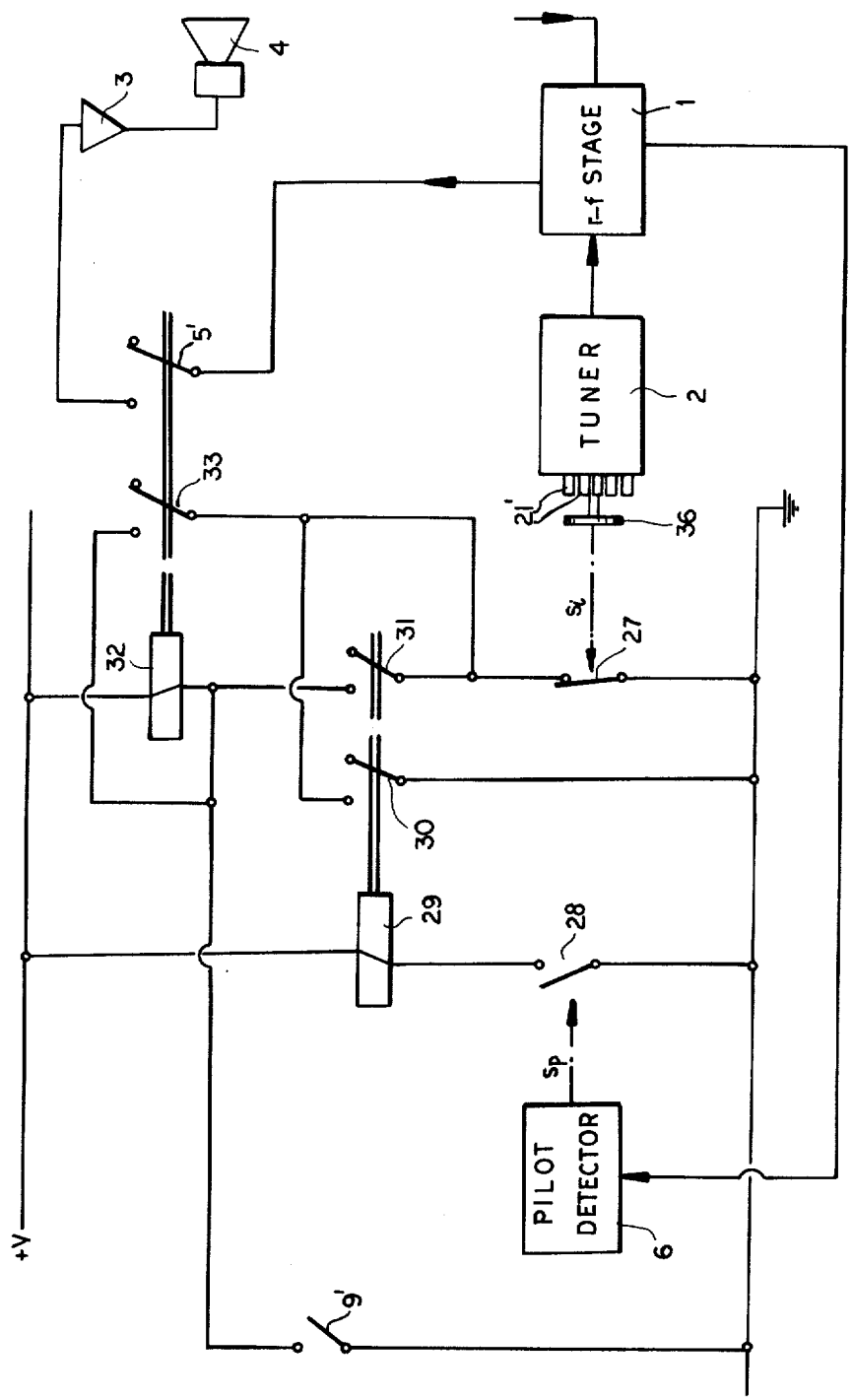
FIG. 4 is a view similar to FIG. 1, illustrating a modification.

In the embodiment of FIG. 4 we have shown the tuner 2 provided with a set of pushbuttons 21 and with a tap switch 36 which produces the interrupt signal $s_i$ whenever any of these pushbuttons is touched by the user to select a station emitting a pilot-modulated carrier wave. Signal $s_i$ is here applied to a normally closed switch 27 in series with an armature 31 of an electromagnetic relay 29 whose winding lies between terminal +V and ground in series with a normally open switch 28 controlled by the enabling signal $s_p$ from detector 6. A second relay 32 in cascade with relay 29 has its winding connected across the d-c supply in series with armature 31 and switch 27; relay 32 has an armature 33, operating as a holding contact, and another armature 5' replacing the coupling switch 5 of FIG. 1.

A selector switch 9' can be closed to shunt the armature 31 and the switch 27 for keeping the relay 32 operated, thereby maintaining the connection between high-frequency stage 1 and low-frequency stage 3, 4. When switch 9' is open, as shown, the holding circuit of relay 32 comprising armature 33 and switch 27 is broken as soon as one of the pushbuttons 21' is manipulated to retune the receiver. Audio stage 4 will then remain cut off until the reception of a pilot tone gives rise to enabling signal $s_p$ with resulting operation of relay 29, bringing on the relay 32 and re-establishing the aforedescribed holding circuit as this relay locks to switch 27 upon the release of the actuated pushbutton 21'. Thus, even a fading of the pilot tone will not interrupt the audible reproduction of the incoming message by loudspeaker 4 until the user again touches one of the pushbuttons of tuner 2. In any event, audio amplifier 3 can be instantly reconnected by placing selector switch 9' in its overriding position.

In FIG. 1 we have also indicated a connect signal $s_c$ which is the complement of disconnect signal $s_d$ and appears on the reset output $\bar{Q}$ of flip-flop 12 when switch 5 is closed. In FIG. 4 the connect signal $s_c$ is the operating current for the relay 32.

We claim:

1. In a radio receiver including a high-frequency stage, a low-frequency stage and coupling means for releasably interconnecting said stages, the combination therewith of:

tuning means connected to said high-frequency stage for adjusting same to pick up incoming carrier waves modulated by a pilot frequency;

detector means connected to said high-frequency stage for emitting an enabling signal only in the presence of said pilot frequency;

sensing means operatively coupled with said tuning means for generating an interrupt signal in response to manipulation of said tuning means; and bistable means with input connections to said detector means and to said sensing means and with an output connection to said coupling means for switching to a first state interconnecting said stages in response to said enabling signal and for switching to a second state disconnecting said low-frequency stage from said high-frequency stage only upon coincidence of said interrupt signal with an absence of said enabling signal, said bistable means being unswitchable from said first state by the disapperance of said enabling signal in the absence of said interrupt signal whereby said stages remain interconnected at least until the next manipulation of said tuning means.

2. The combination defined in claim 1 wherein said tuning means is provided with a manually displaceable adjusting element, said sensing means comprising a motion sensor coacting with said adjusting element.

3. The combination defined in claim 2 wherein said adjusting element is a rotatable knob, said motion sensor comprising a pulse generator mechanically coupled with said knob.

4. The combination defined in claim 3 wherein said sensing means further comprises monostable means interposed between said pulse generator and said bistable means for converting a series of pulses into an interrupt signal of predetermined duration.

5. The combination defined in claim 3 or 4 wherein said pulse generator comprises a disk rotatably linked with said knob, said disk being provided with alternately conducting and nonconducting zones, and a wiper in contact with said disk.

6. The combination defined in claim 1, 2, 3 or 4 wherein said bistable means comprises a flip-flop with a resetting input connected to said detector means and with a switching input connected to said sensing means.

7. The combination defined in claim 1 wherein said tuning means is provided with a manually displaceable actuating element, said sensing means comprising a touch-responsive switch coupled with said actuating element.

8. The combination defined in claim 1, 2 or 7 wherein said bistable means comprises relay means provided with a holding circuit.

9. The combination defined in claim 8 wherein said relay means comprises a first relay with an operating circuit including a first switch controlled by said enabling signal and a second relay in cascade with said first relay, said holding circuit including contacts of said second relay and a second switch controlled by said interrupt signal.

10. The combination defined in claim 1, 2, 3, 4 or 7, further comprising selector means with an overriding position keeping said stages interconnected through said coupling means independently of said enabling and interrupt signals.

* * * * *